June 18, 1968     J. M. POKER ET AL     3,388,928
RAIL CAR COUPLER FOR TRACTORS
Filed June 24, 1966     3 Sheets-Sheet 1
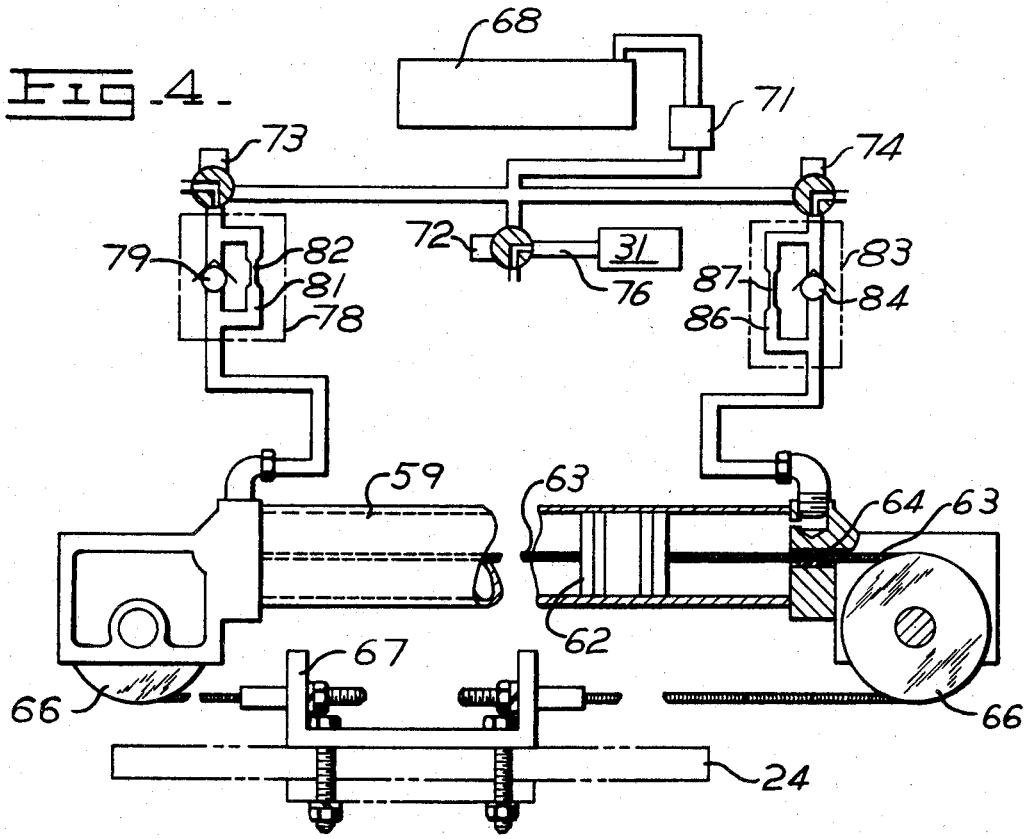
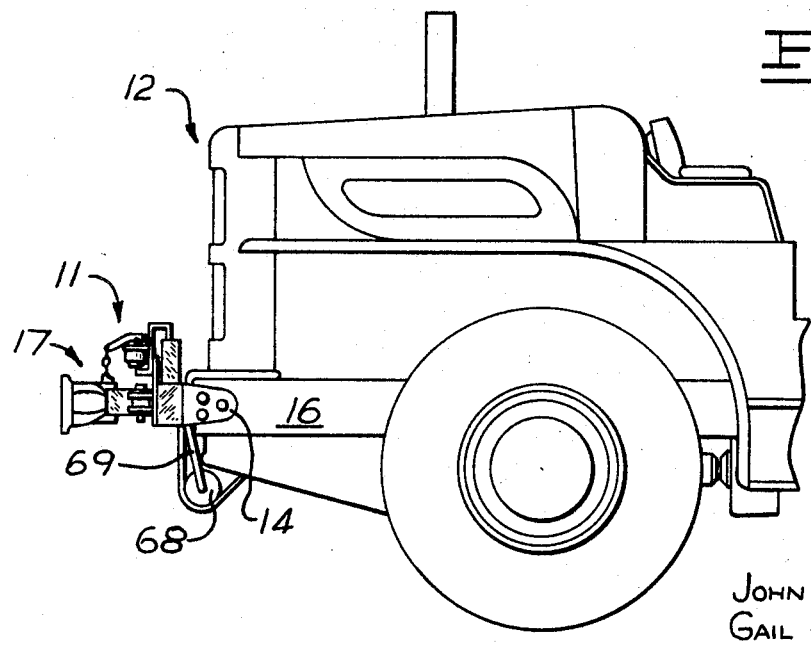
INVENTORS
JOHN M. POKER
GAIL G. BARBEE
DEAN M. LAWRENCE
ROBERT J. ORLAND
BY
ATTORNEYS

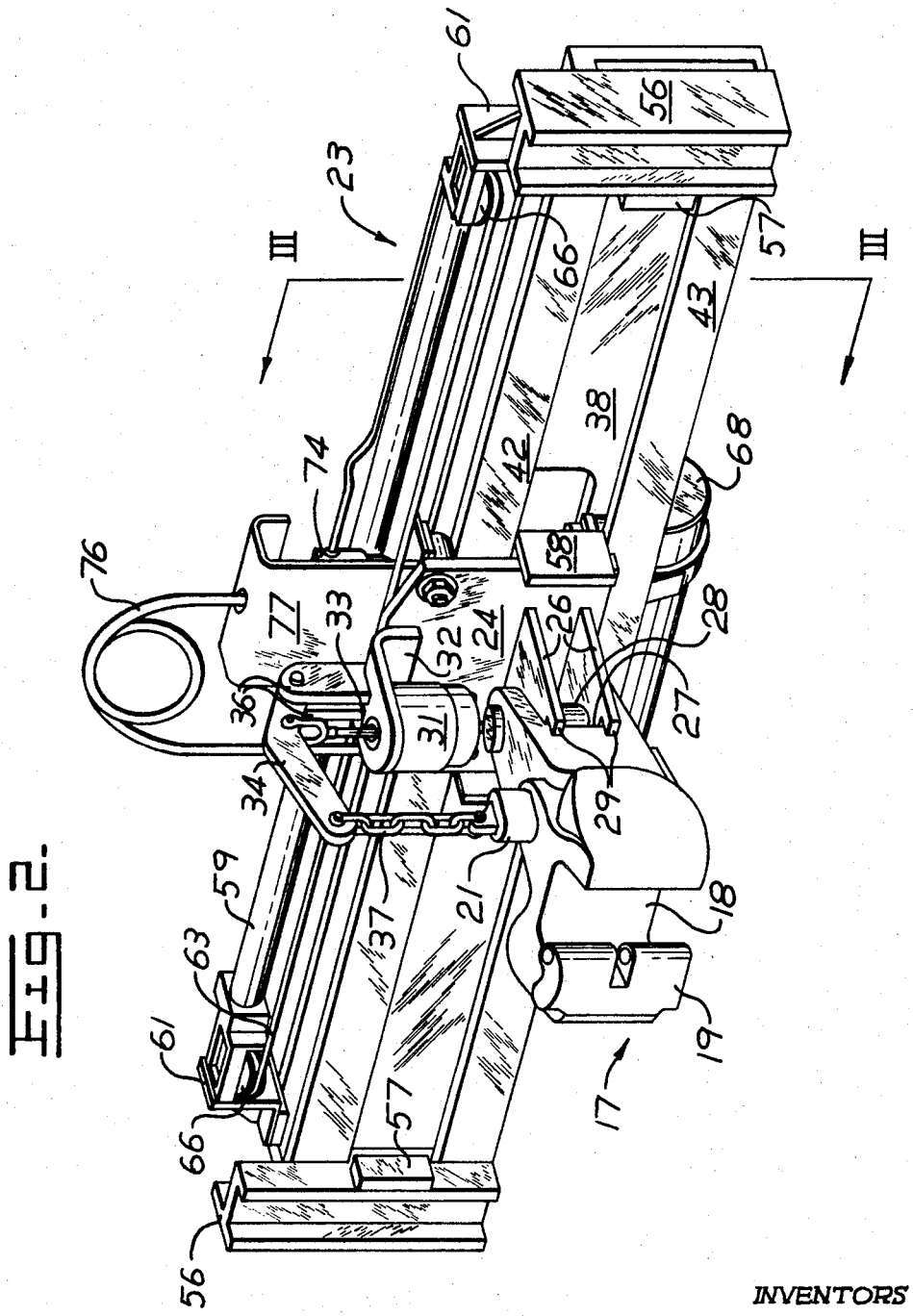

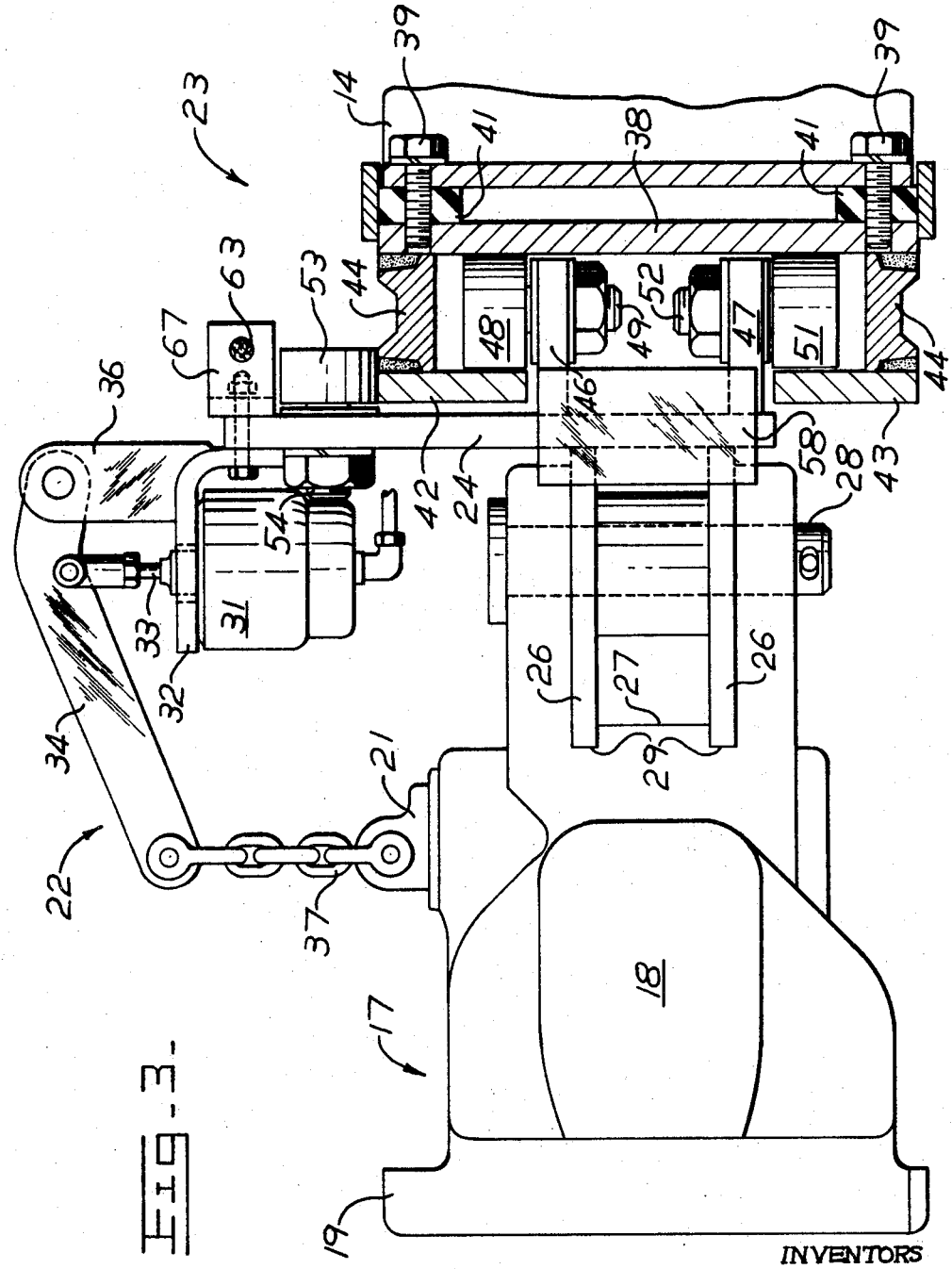

United States Patent Office 3,388,928
Patented June 18, 1968

3,388,928
RAIL CAR COUPLER FOR TRACTORS
John M. Poker, Oswego, and Gail G. Barbee, Dean M. Lawrence, and Robert J. Orland, Aurora, Ill., assignors to Caterpillar Tractor Co., Peoria, Ill., a corporation of California
Filed June 24, 1966, Ser. No. 560,252
5 Claims. (Cl. 280—456)

ABSTRACT OF THE DISCLOSURE

An attachment facilitates use of a tractor or the like for moving railway cars by providing a self-engaging coupler which is shiftable in a transverse direction on the tractor by pneumatic controls to simplify the coupling of the tractor to the car. Means in the pneumatic system facilitate precision locating of the coupling for engaging with the car and further serve to damp unwanted motion of the coupling.

The present invention relates to tractor attachments and more particularly to a power operated coupler which facilitates the use of such vehicles for moving railway cars.

Substantial cost and time savings can be realized in many industrial and mining operations by using tractors, rather than railroad engines, for moving and switching railway cars. In many cases a tractor of some kind is available at the site. A tractor equipped with a loader, for example, is often used for filling the cars and it can be very advantageous to use the same vehicle for such switching operations as may be required.

The adaptation of conventional tractors to this specialized usage is subject to several problems. Some form of coupler attachment is needed and it is desirable for cost, convenience and for safety reasons that it be engageable and disengageable without requiring that the operator dismount from the tractor. Where the tractor is to be used for operations in addition to rail car moving the coupler must not interfere with other attachments. Major problems arise from the fact that the tread of most standard tractors is not such that both rails can be straddled.

Attachments heretofore used for this purpose have not been fully satisfactory from the standpoint of meeting these problems. The simplest provision for moving railcars with a tractor is some form of bumper mounted on the forward or rear surface of the vehicle. This does not provide any means for stopping the car once it is set into motion. Accordingly, the use of bumper-equipped tractors is usually confined to situations where car moving is infrequent and takes place at low speeds and on level track.

To provide more complete control over movement of the rail car, including stopping thereof, various forms of positive coupler have been mounted on tractors. Where these were secured at the centerline of the tractor it has usually been necessary to provide the machine with special axles which spread the tread so that the vehicle can straddle both rails. This is disadvantageous for several reasons in addition to the obvious one of added cost. The axle structure of the machine is weakened thereby detracting from its value for operations other than car moving. Spreading of the wheels may also have the disadvantage of placing the wheels outside the span of other attachments such as loader buckets, bulldozer blades or the like.

The need for extending the tread is avoided by providing a side shifting coupler on the tractor. In these attachments, the coupler is slidable relative to the tractor in a transverse direction. The tractor may then straddle only one of the rails with the coupler being shifted to one side of the centerline of the vehicle in order to engage the coupling device at the centerline of the rail car.

The shiftable couplers heretofore used on tractors have tended to be cumbersome, costly and limited in shifting range. In some instances it has been necessary that the operator dismount from the vehicle and make the adjustment manually. A need exists for a compact unit which is readily attachable to existing tractors without interference with other components thereon and which is controlled wholly from the operator's compartment. It is particularly desirable that the coupler be shiftable across a wide span to decrease the amount of tractor maneuvering required to couple a car and to allow the tractor to cross over a track while coupled to a car. It is highly desirable that means be provided which offers some yielding resistance to sideward travel of the coupling. This facilitates precision locating of the coupling for engaging the car and serves to damp unwanted motion of the coupling when it is not connected to a car.

Accordingly, it is an object of this invention to provide a more compact and versatile coupler attachment for adapting tractors to the moving of railroad cars.

It is another object of the invention to provide a side shifting rail car coupler for tractors having a wide travel span, reduced interference with other tractor attachments, and which is readily mounted on a variety of existing tractor types without substantial modification thereof.

It is still another object of the invention to provide a side shifting rail car coupler for tractors in which the coupler shifting mechanism has an inherent motion damping action thereby providing for precise control and minimized unwanted shifting.

The invention, together with further objects and advantages thereof, will best be understood by reference to the following specification together with the accompanying drawings, of which:

FIGURE 1 is a side elevation view of the rearward portion of a typical wheel tractor having the rail car coupler attachment mounted thereon;

FIGURE 2 is a perspective view of the coupler attachment separated from the tractor;

FIGURE 3 is a side elevation partly in section taken along line III—III of FIGURE 2 with certain elements omitted; and FIGURE 4 is a broken out view of the pneumatic drive cylinder and associated elements with the pneumatic circuitry for operating the cylinder being shown schematically.

Referring now to the drawing and more particularly to FIGURE 1 thereof, the car coupler attachment is secured to the back end of the tractor 12 by brackets 14 which attach to the tractor chassis frame members 16 in this instance. The coupler attachment 11 may be mounted in an essentially similar manner at the front of the tractor 12 in situations where the forward end of the vehicle is free of other accessories which would interfere with the coupler.

Referring now to FIGURE 2, the attachment employs a standard rail car coupler assembly 17 of the type having a forked body 18 with a pivotable knuckle 19 at the end of one arm and a locking element 21, the detailed structure of such couplers being known to those skilled in the art. Such couplers engage a corresponding unit on another vehicle upon being brought together and remain linked until such time as the locking element 21 is lifted.

To carry the coupler 17 a movable carriage assembly 22 rides on a horizontal rail assembly 23. Carriage assembly 22 has a vertical plate 24, adjacent the rail assembly 23, and a pair of vertically spaced members 26 project therefrom into the slot 27 on the shank of coupler body 18, the coupler body being joined to the members 26 by a vertical pin 28. Projections 29 at the sides of members 26 limit pivoting of the coupler body 18 about the pin 28.

Lifting of the locking element 21, to disengage the car coupler, is effected by an upright pneumatic drive cylinder 31 situated above the shank of coupler body 18 and secured to carriage plate 24 by a bracket 32. The piston rod 33 of drive cylinder 31 extends upwardly to connect with a lever 34 which is pivoted at one end to a pair of posts 36 on bracket 32. A chain 37 connects the opposite end of lever 34 to locking element 21 so that actuation of drive cylinder 31, by controls to be hereinafter described, raises the locking element and allows the car coupler to disengage.

Referring now to FIGURES 2 and 3 in conjunction, the rail assembly 23 is supported by a backing plate 38 which extends across the rearward end of the tractor and which is secured to the previously described brackets 14 by bolts 39. To cushion the tractor against sharp shocks resulting from impaction of the mechanism against a rail car coupler, pads 41 of a resilient material such as rubber are disposed between the backing plate and the brackets. Upper and lower rails 42 and 43 respectively extend parallel to backing plate 38 and are held outwardly therefrom by spacer members 44, the backing plate, rails and spacers preferably being welded together to form a rigid unit.

As shown in FIGURES 3 in particular, spaced upper and lower shelves 46 and 47 project from the movable carriage plate 24 towards the rail assembly backing plate 38 between the upper and lower rails 42 and 43. A series of rollers 48 are mounted above upper shelf 46 on axle pins 49 which project upwardly therefrom and a like number of rollers 51 are disposed below the lower shelf 47 on downwardly extending axle pins 52. The rollers 48 and 51 bear against the adjacent surfaces of rails 42 and 43 respectively and against backing plate 38 depending on the direction of travel of the tractor and the rail car coupled thereto and thus secure the coupler assembly 22 to the rail assembly 23 while allowing transverse movement therebetween.

To provide vertical support for the carriage assembly 22 without excessive friction, an additional pair of rollers 53 are mounted on the carriage plate 24, on axle pins 54, and ride along the upper edge of the upper rail 42.

It is often advantageous to be able to use a projecting element of the tractor for pushing against a corner of a car in order to separate the car from another a distance sufficient to permit coupling thereto. Referring again to FIGURE 2 in particular, this operation is facilitated by upright posts 56 secured to each end of the rail assembly 23. Posts 56 protrude a small distance beyond the rails 42 and 43 and a resilient pad 57 is secured to each of the posts in position to be contacted by bumper plates 58 on each side of carriage assembly 22 thereby cushioning movement of the carriage at the limits of travel thereof.

To position the carriage 22 along the rail assembly 23 a specialized form of pneumatic drive is provided in which a long drive cylinder 59 extends along the top of the rail assembly and is secured thereto at each end by brackets 61. Drive cylinder 59 has a length corresponding to the full travel of the carriage assembly 22 and is parallel to the rails 42 and 43 along which the carriage travels.

Referring now to FIGURE 4, drive cylinder 59 is of the type having a slidable piston 62 therein and in which cables 63 are attached to each end of the piston and emerge from the ends of the cylinder through seals 64. Cables 63 are doubled back around pulleys 66 at each end of the cylinder 59 and connect to a bracket 67 on the carriage plate 24. Movement of the piston 62 within cylinder 59 thus produces an equal but oppositely directed movement of the carriage along the rail assembly.

A unique pneumatic control system allows the tractor operator to position the carriage and car coupler laterally by operating control valves and provides for precision control of such movement, and for stabilizing the carriage, by pneumatically cushioning carriage travel. The system operates from a compressed air tank 68 which, as shown in FIGURE 1, may be situated below the rail assembly 23 and tractor body 12. Tank 68 is preferably supplied with compressed air from the tractor brake system through a conduit 69, provisions being made to insure that the brake air supply is not depleted by the car coupler attachment.

Referring now to FIGURE 4, high pressure air is supplied from tank 68, through a lubricator 71, to each of three control valves 72, 73 and 74 which are preferably solenoid valves operable from the tractor operator's compartment. First control valve 72 supplies the locking element lifter drive cylinder 31 through a conduit 76 which, as shown in FIGURE 2, is a coiled flexible hose to allow for the travel of cylinder 31 with the carriage assembly 23. As also shown in FIGURE 2, the valves, such as valve 74, are disposed above the center of the rail assembly 23 and are protected by an upwardly projecting angled guard plate 77 thereon.

Referring again to FIGURE 4, the second control valve 73 supplies compressed air to a first end of the carriage positioning drive cylinder 59 through a first metering unit 78. Metering unit 78 is comprised of a check valve 79, limiting air flow to a direction towards the cylinder 59, which is bypassed by a conduit 81 having a flow restriction 82 therein. The third control valve 74 supplies air to the opposite end of the drive cylinder 59 through a second metering unit 83 also having a check valve 84 to limit air to a direction towards cylinder 59 and which is also bypassed by a conduit 86 having a flow restriction 87.

Thus by opening control valve 73 high pressure air is admitted to an end of drive cylinder 59 through the check valve 79 of the metering unit 78 thereby exerting a force on piston 62 which tends to drive the piston towards the opposite end of the cylinder. To allow such movement, air bleeds from the opposite end of cylinder 59 through the flow restriction 87 of metering unit 83 and is exhausted to atmosphere through the third control valve 74. A similar but oppositely directed motion of the piston is effected by operating the third control valve 74. Through cables 63, movement of the piston 62 in either direction results in an opposite translation of the coupler carriage 22 across the end of the tractor.

One effect of the metering units 78 and 83 is to prevent an unduly rapid and somewhat uncontrolled movement of the carriage by providing a back pressure against piston 62. Further, by limiting the rapid escape of air from either end of cylinder 59, the metering units 78 and 83 serve to damp any tendency of the carriage 22 to roll freely back and forth on the rail assembly 23.

In operation, the tractor is advanced towards the rail car which is to be moved with the tractor straddling one, but not necessarily both, rails. To bring the coupler assembly 22 into position for engaging the coupler of the rail car, the operator need only actuate control valve 73 or 74. Such action compensates for the fact that the tractor may not be centered with respect to the rail car and eliminates any need to repeatedly maneuver the tractor itself in order to bring the two couplings into alignment. Disengagement of the rail car is readily effected by actuating control valve 72 causing cylinder 31 to operate lock release 21.

What is claimed is:

1. An attachment for a motor driven vehicle for facilitating use of said vehicle in moving railway cars of the class having self-engaging coupling devices at the ends thereof; comprising a rail structure, means for mounting said rail structure transversely across an end of said vehicle, a carriage supported by said rail structure and being travelable thereon, a car coupler attached to said carriage and projecting therefrom for engaging said railway cars, a first pneumatic drive cylinder secured to said rail structure, said first cylinder having a piston therein, wherein said first pneumatic cylinder is substantially parallel to said rail structure and substantially coextensive therewith and is of the class having flexible cables connected to opposite sides of said piston and extending therefrom through the ends of said first cylinder, a pair of pulleys disposed one at each end of said first cylinder, said cables being engaged on said pulleys and doubled back thereon to connect with opposite sides of said carriage thereby coupling said piston to said carriage whereby said carriage may be moved transversely across said end of said vehicle, and means for selectively supplying high pressure fluid to said first cylinder to drive said piston therein.

2. An attachment for a motor driven vehicle for facilitating use of said vehicle in moving railway cars of the class having self-engaging coupling devices at the ends thereof, comprising a rail having a backing plate and a pair of vertically separated coplanar rails spaced from said backing plate, means for mounting said rail structure transversely across an end of said vehicle, a carriage supported by said rail structure and being travelable thereon, said carriage being mounted thereon by a support structure having a member extending towards said backing plate between said rails and carrying a first plurality of roller wheels which ride against said rails and against said backing plate according to the direction of the loading on said carriage, a second plurality of roller wheels on said carriage and riding on a horizontal surface of said rail structure, a car coupler attached to said carriage and projecting therefrom for engaging said railway cars, a first pneumatic drive cylinder secured to said rail structure, said first cylinder having a piston therein, means for selectively supplying high pressure fluid to said first cylinder to drive said piston therein, and means coupling said piston on said first cylinder to said carriage whereby said carriage may be moved transversely across said end of said vehicle.

3. An attachment for a motor driven vehicle for facilitating use of said vehicle in moving railway cars of the class having self-engaging coupling devices at the ends thereof, comprising a rail structure, means for mounting said rail structure transversely across an end of said vehicle, a carriage supported by said rail structure and being travelable thereon, a car coupler attached to said carriage and projecting therefrom for engaging said railway cars, a first pneumatic drive cylinder secured to said rail structure, said first cylinder having a piston therein and having a fluid passage at each end thereof, means for selectively supplying high pressure fluid to said first cylinder to drive said piston therein having a pair of control valves each being coupled to a separate one of said passages of said first cylinder, each of said control valves having a first setting connecting the associated one of said passages with a source of high pressure fluid and having a second setting at which the associated one of said passages is vented to the atmosphere, the flow aperture at said second setting of said control valves being smaller than the flow aperture at said first setting of said control valves, and means coupling said piston of said first cylinder to said carriage whereby said carriage may be moved transversely across said end of said vehicle.

4. An attachment for a motor driven vehicle for facilitating use of said vehicle in moving railway cars of the class having self-engaging coupling devices at the ends thereof, comprising a rail structure, means for mounting said rail structure transversely across an end of said vehicle, a carriage supported by said rail structure and being travelable thereon, a car coupler attached to said carriage and projecting therefrom for engaging said railway cars, a first pneumatic drive cylinder secured to said rail structure, said first cylinder having a piston therein, and having a fluid passage at each end thereof, a pair of check valves each connected to a separate one of said passages of said cylinder and limiting fluid flow to a direction theretowards, a pair of bypass conduits each having a flow restriction therein and each being connected across a separate one of said check valves, and a pair of control valves each being connected between a source of high pressure fluid and a separate one of said check valves and bypass conduits to drive said piston, each of said control valves having a first setting connecting said source to the associated one of said check valves and bypass conduits and having a second setting venting the associated one of said check valves and bypass conduits to the atmosphere, and means coupling said piston of said first cylinder to said carriage whereby said carriage may be moved transversely across said end of said vehicle.

5. In combination with a motor vehicle, an attachment for facilitating use of said vehicle for moving railway cars comprising: a rail structure, means for mounting said rail structure transversely across an end of said vehicle, a carriage supported by said rail structure and being travelable thereon, a car coupler attached to said carriage and projecting therefrom for engaging said railway cars, upright posts secured to each end of the rail structure to protrude therebeyond, the rail structure providing a span exceeding the tread distance between the wheels of said vehicle whereby said post structure at the ends of said rails may be used to apply force against the corners of said railway cars to separate them from each other for coupling purposes.

References Cited

UNITED STATES PATENTS

| | | | |
|---|---|---|---|
| 1,012,255 | 12/1911 | Hogen | 213—2 |
| 1,607,251 | 11/1926 | Easter | 213—212 |
| 2,653,031 | 9/1953 | Butler | 280—468 |
| 2,721,522 | 10/1955 | Ames | 105—215 X |
| 3,155,250 | 11/1964 | French et al. | 214—138 |
| 3,198,137 | 8/1965 | White | 105—26 |
| 3,245,553 | 4/1966 | Cope | 213—212 |
| 3,118,688 | 1/1964 | Stilley | 280—447 |

LEO FRIAGLIA, *Primary Examiner.*